US012592626B2

(12) United States Patent
Zhang et al.

(10) Patent No.: US 12,592,626 B2
(45) Date of Patent: Mar. 31, 2026

(54) POWER SUPPLY DEVICE AND POWER SUPPLY METHOD FOR DIRECT CURRENT ELECTRIC ARC FURNACE

(71) Applicants: CISDI ENGINEERING CO., LTD, Chongqing (CN); CISDI Research & Development Co., LTD, Chongqing (CN)

(72) Inventors: YuChuan Zhang, Chongqing (CN); QiMing Huang, Chongqing (CN); NingChuan Yang, Chongqing (CN); CunZhen Tan, Chongqing (CN)

( * ) Notice: Subject to any disclaimer, the term of this patent is extended or adjusted under 35 U.S.C. 154(b) by 1079 days.

(21) Appl. No.: 17/619,247

(22) PCT Filed: Jul. 8, 2020

(86) PCT No.: PCT/CN2020/100889
§ 371 (c)(1),
(2) Date: Dec. 14, 2021

(87) PCT Pub. No.: WO2020/249135
PCT Pub. Date: Dec. 17, 2020

(65) Prior Publication Data
US 2022/0286036 A1 Sep. 8, 2022

(30) Foreign Application Priority Data

Jun. 14, 2019 (CN) .......................... 201910514242.5

(51) Int. Cl.
*H02M 1/00* (2007.01)
*F27D 11/10* (2006.01)
(Continued)

(52) U.S. Cl.
CPC ........... *H02M 1/0016* (2021.05); *F27D 11/10* (2013.01); *F27D 19/00* (2013.01); *H02J 1/10* (2013.01);
(Continued)

(58) Field of Classification Search
CPC ...... H02M 1/0016; H02M 1/007; H02M 3/04; H02M 5/14; H02M 7/04; F27D 11/10; F27D 19/00; F27D 2019/0028; H02J 1/10
(Continued)

(56) References Cited

U.S. PATENT DOCUMENTS 2,730,560 A * 1/1956 Hage .................. G05D 23/1906
65/29.21
4,057,704 A * 11/1977 Geus ...................... B23K 9/291
219/136
(Continued)

FOREIGN PATENT DOCUMENTS

JP 2014032782 A * 2/2014
WO WO-2016146754 A1 * 9/2016 ........... H02H 1/0015

*Primary Examiner* — Jimmy Chou
(74) *Attorney, Agent, or Firm* — Michael D. Eisenberg; MDE Patents

(57) ABSTRACT

The present invention provides a power supply device and a power supply method for a DC electric arc furnace, wherein the power supply device comprises phase-shifting rectifier transformers, rectifying units and a regulator; through a structural design of a plurality of branches and a plurality of rectifying units at an output end of each phase-shifting rectifier transformer, and a structural design that outputs of the plurality of rectifying units are connected in parallel and then connected to a power supply short network of a DC electric arc furnace through bus bars, a current output topological structure is formed, which can provide a stable large current for one electrode assembly, and a plurality of current output topological structures can supply power to a plurality of electrode assemblies, so that requirement of a larger power supply current of the DC electric arc furnace can be satisfied; positions of top electrodes are judged and adjusted by the regulator according to real-time working parameters, which ensures that a lifting mechanism of the top electrodes can steadily perform the function of stabiliz-
(Continued)

ing arc burning for a long time; at the same time, output voltages and output currents of the rectifying units are adjusted by the regulator according to feedback of the real-time working parameters, so as to provide stable electric energy for the DC electric arc furnace.

10 Claims, 2 Drawing Sheets

(51) Int. Cl.
| | |
|---|---|
| *F27D 19/00* | (2006.01) |
| *H02J 1/10* | (2006.01) |
| *H02M 3/04* | (2006.01) |
| *H02M 5/14* | (2006.01) |
| *H02M 7/04* | (2006.01) |

(52) U.S. Cl.
CPC ............ *H02M 1/007* (2021.05); *H02M 3/04* (2013.01); *H02M 5/14* (2013.01); *H02M 7/04* (2013.01); *F27D 2019/0028* (2013.01)

(58) Field of Classification Search
USPC ......................................................... 373/104
See application file for complete search history.

(56) References Cited

U.S. PATENT DOCUMENTS

| | | | |
|---|---|---|---|
| 6,687,284 B1* | 2/2004 | Beauregard ............ | H05B 7/144 |
| | | | 373/102 |
| 2005/0218132 A1* | 10/2005 | Wells ..................... | B23K 9/291 |
| | | | 219/137.61 |
| 2008/0298425 A1* | 12/2008 | Jackson ................... | H05B 7/20 |
| | | | 219/121.11 |
| 2016/0013729 A1* | 1/2016 | Josse ........................ | H02J 7/35 |
| | | | 363/126 |

* cited by examiner

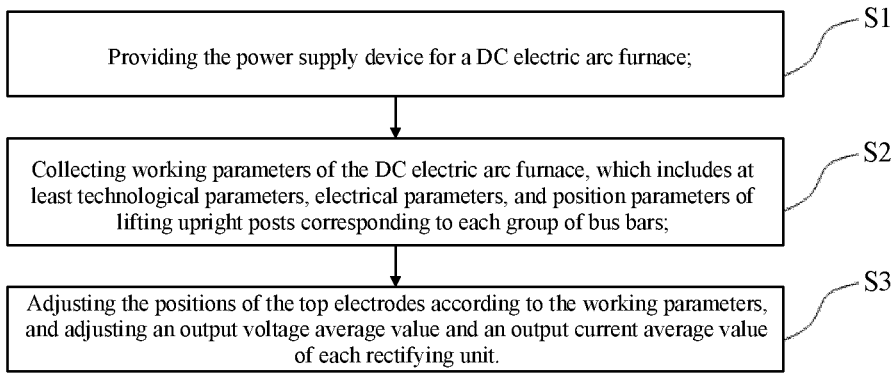

<table>
<tr><td>Providing the power supply device for a DC electric arc furnace;</td><td>S1</td></tr>
<tr><td>Collecting working parameters of the DC electric arc furnace, which includes at least technological parameters, electrical parameters, and position parameters of lifting upright posts corresponding to each group of bus bars;</td><td>S2</td></tr>
<tr><td>Adjusting the positions of the top electrodes according to the working parameters, and adjusting an output voltage average value and an output current average value of each rectifying unit.</td><td>S3</td></tr>
</table>

Fig. 3

POWER SUPPLY DEVICE AND POWER SUPPLY METHOD FOR DIRECT CURRENT ELECTRIC ARC FURNACE

FIELD OF INVENTION

The present invention relates to the technical field of metallurgy, and particularly to a power supply device and a power supply method for a DC electric arc furnace.

BACKGROUND ART OF THE INVENTION

A DC power supply for a DC electric arc furnace is core equipment of the DC electric arc furnace, which is usually comprised of step-down transformers, rectifying devices and a series reactor. A direct current enters electrodes through a short network, and at least one top electrode and one bottom electrode are arranged in the DC electric arc furnace. Arc discharge is generated by controlling the distance between the top electrode and the bottom electrode to melt a metal material.

A traditional DC power supply for a DC electric arc furnace is a power supply with a certain DC capacity, an output voltage is adjusted by adjusting a tap voltage of a rectifier transformer, an electric arc is generated by adjusting the distance between the top electrode and the bottom electrode (fixed) through an electrode regulation system, and stable discharge burning of the electric arc is maintained by detecting an output current or voltage to adjust the distance between the top electrode and the bottom electrode. When the output voltage is adjusted by adjusting a tap voltage of a rectifier transformer, the range of voltage regulation is limited. When the electric arc is stabilized by adjusting the distance between the top electrode and the bottom electrode, as the position change of the bottom electrode (steel scrap melting or molten pool fluctuation) in a furnace burden melting process and the intensity change of an electric field in the furnace result in an arc current change in the dynamic electrical characteristics of the electric arc during use, an arc column of the electric arc cannot rapidly enter a next stable point, thereby causing the regulation system to be either overshot or repeatedly shaken, and in some cases, instability of a short network system will be aggravated.

At present, in order to improve the steelmaking quality of the electric arc furnace, although a series of technologies are developed at home and abroad to prevent the above situations from occurring in the electrode regulation system of the electric arc furnace, the effect is not ideal; the existing electric arc furnace regulator still has the problem that the electric arc furnace regulator can only implement regulation by judging the change of arc current, voltage or impedance, but cannot judge the actual change of the arc column of electric arc with the furnace condition, causing that the regulation system of the electric arc furnace cannot guarantee the stable realization of the optimal function for a long time.

DISCLOSURE OF THE INVENTION

In view of the defects in the prior art, the present invention provides a technical solution for stable power supply of a DC electric arc furnace to solve the above technical problem.

To achieve the above purpose and other relevant purposes, the present invention provides a power supply device for a DC electric arc furnace, comprising: phase-shifting rectifier transformers, rectifying units and a regulator;

An input end of each phase-shifting rectifier transformer is connected to a power grid, a plurality of branches are led out from an output end of the phase-shifting rectifier transformer, each branch is respectively connected to one of the rectifying units, and outputs of a plurality of rectifying units are connected in parallel and then connected to a power supply short network of a DC electric arc furnace through bus bars, so that a current output topological structure is formed; an alternating current provided by the power grid is supplied to an electrode assembly of the DC electric arc furnace after voltage reduction, phase shifting, rectification, chopping and confluence, wherein the electrode assembly comprises top electrodes and a bottom electrode, and the top electrodes are arranged on a lifting mechanism;

The lifting mechanism is controlled by the regulator to adjust positions of the top electrodes; at the same time, output voltages and output currents of the rectifying units are controlled by the regulator.

Optionally, each rectifying unit comprises a rectifier and a DC chopper; an input end of the rectifier is connected to the output end of the phase-shifting rectifier transformer, an output end of the rectifier is connected to an input end of the DC chopper, an output end of the DC chopper is connected to a bus bar, and the bus bar is connected to the power supply short network; an input alternating current is rectified into a direct current by the rectifier, and an output voltage value and an output current value of the DC chopper are adjusted by the regulator.

Optionally, the power supply device for a DC electric arc furnace comprises a plurality of phase-shifting rectifier transformers, the current output topological structure corresponding to each phase-shifting rectifier transformer is respectively connected to a group of bus bars, the group of bus bars are respectively connected to an electrode assembly, and the electrode assembly comprises the bottom electrode and at least one top electrode.

Optionally, the DC electric arc furnace comprises a plurality of electrode assemblies, and the plurality of electrode assemblies share one bottom electrode.

To achieve the above purpose and other relevant purposes, the present invention also provides a power supply method for a DC electric arc furnace, comprising the following steps:

Providing the power supply device for a DC electric arc furnace as described in any one of the above paragraphs;

Collecting working parameters of the DC electric arc furnace, which includes at least technological parameters, electrical parameters, and position parameters of lifting upright posts corresponding to each group of bus bars; and Adjusting the positions of the top electrodes according to the working parameters, and adjusting an output voltage value and an output current value of each rectifying unit.

Optionally, the technological parameters includes at least technological smelting stage information, an influence coefficient of smelting stage on stability of arc stability, and a current preset value of the top electrodes, and the electrical parameters includes an output voltage average value of DC choppers, an output current average value of the DC choppers, and conduction time of the DC choppers.

Optionally, the step of adjusting the positions of the top electrodes according to the working parameters comprises:

Obtaining an instantaneous arc stability rate and an output intermediate value of a target executor according to the working parameters;

Respectively calculating difference between a current value corresponding to the output intermediate value and a current preset value, difference between a detected current value and the current preset value, and comparing the two differences;

Outputting a final value of the target executor according to comparison result.

Optionally, a calculation formula of the instantaneous arc stability rate is as follows:

$$G_{fn} = \left| \frac{K_{1n}\frac{\partial i_n}{\partial t} + K_{2n}\frac{\partial u_n}{\partial t}}{K_{3n}\frac{\partial d_n}{\partial t}} \right|$$

Wherein $G_{fn}$ is the instantaneous arc stability rate of the $n^{th}$ top electrode, $K_{1n}$ is a current change correction coefficient of the $n^{th}$ top electrode, Ken is a voltage change correction coefficient of the $n^{th}$ top electrode, $K_{3n}$ is an electrode mast speed change correction coefficient of the $n^{th}$ top electrode, $i_n$ is a current function of the $n^{th}$ top electrode, $u_n$ is a voltage function of the $n^{th}$ top electrode, $d_n$ is an electrode position function of the $n^{th}$ top electrode, and n is a positive integer.

Optionally, electrode mast speed of each top electrode is periodically detected, and the electrode mast speed change correction coefficient is dynamically corrected according to detection results.

Optionally, a calculation formula of the output intermediate value of the target executor is as follows:

$$s_n = K_p\left[(\beta_{nN} * G_{fnN} - \beta_{n(N-1)} * G_{fn(N-1)}) - \frac{I_{cn}}{K}\right] + K_I * \left(\beta_{nN} * G_{fnN} - \frac{I_{cn}}{K}\right) +$$

$$K_D\left(\beta_{nN} * G_{fnN} - 2\beta_{n(N-1)} * G_{fn(N-1)} + \beta_{n(N-2)} * G_{fn(N-2)} - 2\frac{I_{cn}}{K}\right)$$

Wherein $s_n$ is the output intermediate value of the target executor corresponding to the $n^{th}$ top electrode, $K_p$ is a proportionality coefficient, $K_I$ is an integral time conversion constant, $K_D$ is a differential time conversion constant, K is a hydraulic proportional amplification coefficient, $\beta_{nN}$ is a parameter of the technological smelting stage information of the $N^{th}$ stage corresponding to the $n^{th}$ top electrode, $G_{fnN}$ is the instantaneous arc stability rate of the $N^{th}$ stage corresponding to the $n^{th}$ top electrode, $I_{cn}$ is the current preset value of the $n^{th}$ top electrode, $\beta_{n(N-1)}$ is a parameter of the technological smelting stage information of the $(N-1)^{th}$ stage corresponding to the $n^{th}$ top electrode, $G_{fn(N-1)}$ is the instantaneous arc stability rate of the $(N-1)^{th}$ stage corresponding to the $n^{th}$ top electrode, $\beta_{n(N-2)}$ is a parameter of the technological smelting stage information of the $(N-2)^{th}$ stage corresponding to the $n^{th}$ top electrode, $G_{fn(N-2)}$ is the instantaneous arc stability rate of the $(N-2)^{th}$ stage corresponding to the $n^{th}$ top electrode, and N is an integer greater than or equal to 3.

Optionally, the step of outputting a final value of the target executor according to comparison result comprises:

When the comparison result is within a preset threshold range, the final value of the target actuator is 0;

When the comparison result is outside the preset threshold range:

If $K*s_n-I_{cn}>0$ and $I_n-I_{cn}>0$, then

When $K*s_n>I_n$,

An output value is $$Sn = \partial\left(\frac{I_n}{K} - s_n\right),$$

When $K*s_n<I_n$,

An output value is $$Sn = \partial\left(s_n - \frac{I_n}{K}\right);$$

If $K*s_n-I_{cn}<0$ and $I_n-I_{cn}>0$, or $K*s_n-I_{cn}>0$ and $I_n-I_{Ccn}<0$, then An output value is $$Sn = \partial\left(s_n - \frac{I_{cn}}{K}\right);$$

If $K*s_n-I_{cn}<0$ and $I_n-I_{cn}<0$,

When $K*s_n<I_n$,

An output value is $$Sn = \partial\left(s_n - \frac{I_n}{K}\right);$$

Wherein $K*s_n$ is the current value corresponding to the output intermediate value $s_n$, $I_n$ is the detected current value of the $n^{th}$ top electrode, Sn is the final value of the target actuator corresponding to the $n^{th}$ top electrode, and $\partial$ is an adjustment sensitivity.

Optionally, the output voltage value and the output current value of each rectifying unit are adjusted according to the following calculation formula:

$$V_{arc}=V_{dc}\times(T_{on}/T), \; I_{arc}=I_{dc}\times(T/T_{on})$$

Wherein $V_{arc}$ is the output voltage average value of the DC choppers, $V_{dc}$ is an output voltage of the rectifier, $T_{on}$ is the conduction time of the DC choppers, T is a work cycle of the DC choppers, $I_{arc}$ is the output current average value of the DC choppers, and $I_{dc}$ is an output current of the rectifier.

Optionally, a prediction model is established and an electric arc is predicted according to the technological parameters, the electrical parameters, and the position parameters of the lifting upright posts corresponding to each group of bus bars collected in real time.

To achieve the above purpose and other relevant purposes, the present invention also provides a computer readable storage medium, storing computer programs which, when executed by a processor, realize the method as described in any one of the above paragraphs.

Furthermore, to achieve the above purpose and other relevant purposes, the present invention also provides an electronic terminal, comprising: the processor and a memory;

The memory is used for storing the computer programs, and the processor is used for executing the computer programs stored by the memory, so as to make the electronic terminal execute the method as described in any one of the above paragraphs.

As described above, the technical solution for stable power supply of a DC electric arc furnace provided by the present invention has the following beneficial effects:

1) Through a structural design of a plurality of branches and a plurality of rectifying units at an output end of each phase-shifting rectifier transformer, and a structural design that outputs of the plurality of rectifying units are connected in parallel and then connected to a power supply short network of a DC electric arc furnace through bus bars, a current output topological structure is formed, which can provide a stable large current for one electrode assembly, and a plurality of current output topological structures can supply power to a plurality of electrode assemblies, so that requirement of a larger power supply current of the DC electric arc furnace can be satisfied;

2) Positions of top electrodes are judged and adjusted by the regulator according to real-time working parameters, which ensures that a lifting mechanism of the top electrodes can steadily perform the function of stabilizing arc burning for a long time; at the same time, the regulator is connected to the rectifying units, and output voltages and output currents of the rectifying units are adjusted by the regulator according to feedback of the real-time working parameters, so as to provide stable electric energy for the DC electric arc furnace.

DESCRIPTION OF THE DRAWINGS

FIG. 3 is a schematic diagram of a power supply method for a DC electric arc furnace in an embodiment of the present invention.

DESCRIPTION OF PART MARKS

1, 1-1, M-1 Phase-shifting rectifier transformers
2, 1-2, M-2 Rectifiers
3 Reactor
1-3, M-3 DC choppers
Regulator
5, 1-5, M-5 Bus bars
61, 1-61, M-61 Top electrodes
62 Bottom electrode

DETAILED DESCRIPTION OF THE INVENTION

Figure 1:
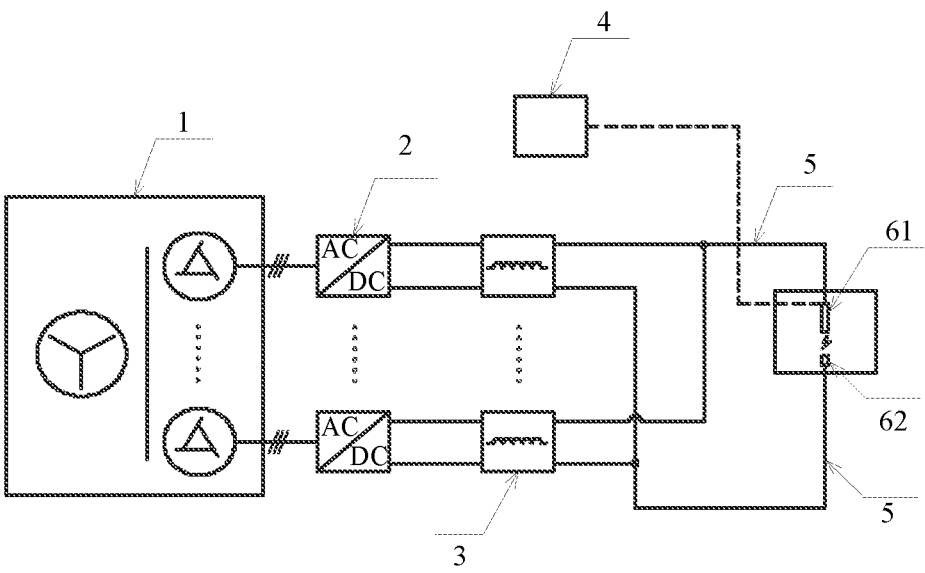
FIG. 1 is a structural schematic diagram of a traditional power supply device for a DC electric arc furnace.

As mentioned in the background art of the invention, and as shown in FIG. 1, a power supply for a DC electric arc furnace in the prior art is usually comprised of phase-shifting rectifier transformers 1, rectifiers 2 and a series reactor 3. An input end of each phase-shifting rectifier transformer 1 is connected to a power grid, a plurality of branches are led out from an output end of the phase-shifting rectifier transformer 1, each branch is respectively connected in series with one rectifier 2 and the reactor 3, and outputs of the plurality of branches are connected in parallel and then connected to a power supply short network of a DC electric arc furnace through bus bars 5, so that a current output topological structure is formed, and a rectifying power supply is obtained; an alternating current provided by the power grid is supplied to an electrode assembly of the DC electric arc furnace after voltage reduction, rectification and confluence, wherein the electrode assembly comprises top electrodes 61 and a bottom electrode 62, the top electrodes 61 are removable electrodes (the top electrodes 61 are arranged on a lifting mechanism), the bottom electrode 62 is a fixed electrode, and arc discharge is generated by controlling the distance between the top electrodes 61 and the bottom electrode 62 to melt a metal material.

The inventor finds through study that: based on the structure shown in FIG. 1, the output voltage of a traditional power supply for a DC electric arc furnace is usually adjusted by adjusting a tap voltage of a rectifier transformer 1, by the range of voltage regulation is limited. At the same time, an electric arc is generated by adjusting the distance between the top electrodes 61 and the bottom electrode 62 through an electrode regulation system, as the position change of the bottom electrode 62 (steel scrap melting or molten pool fluctuation) in a furnace burden melting process and the intensity change of an electric field in the furnace result in an arc current change in the dynamic electrical characteristics of the electric arc during use, an arc column of the electric arc cannot rapidly enter a next stable point, thereby causing the regulation system to be either overshot or repeatedly shaken, and even instability of a short network system will be aggravated. Stable discharge burning of the electric arc is maintained by detecting an output current or voltage through the electrode regulation system to adjust the distance between the top electrodes 61 and the bottom electrode 62; when an input power is large, the current density of an input current exceeds that of a single electrode (top electrode 61 or bottom electrode 62); two or more top electrodes 61 (graphite electrodes) are connected through one rectifying power supply to input electrical energy; as the burning losses of the graphite electrodes are different due to arc burning, the positions of two or more top electrodes 61 relative to the bottom electrode 62 are different in a smelting process, causing that the input current is unbalanced, arc current cannot be effectively stabilized by the electrode regulation system, and current fluctuation is amplified. In addition, due to the characteristics of smelting conditions of the electric arc furnace, the current changes sharply and shortly, and overload often occurs; in order to avoid frequent overcurrent damage to DC rectifying power supply, equipment allowances of the phase-shifting rectifier transformers 1 and the rectifiers 2 are amplified, which results in equipment waste.

Based on this, the present invention proposes a power supply device for a DC electric arc furnace, wherein the power supply device comprises: phase-shifting rectifier transformers, rectifying units and a regulator;

An input end of each phase-shifting rectifier transformer is connected to a power grid, a plurality of branches are led out from an output end of the phase-shifting rectifier transformer, each branch is respectively connected to one of the rectifying units, and outputs of a plurality of rectifying units are connected in parallel and then connected to a power supply short network of a DC electric arc furnace through bus bars, so that a current output topological structure is formed; an alternating current provided by the power grid is supplied to an electrode assembly of the DC electric arc furnace after voltage reduction, phase shifting, rectification, chopping and confluence, wherein the electrode assembly comprises top electrodes and a bottom electrode, and the top electrodes are arranged on a lifting mechanism;

The lifting mechanism is controlled by the regulator to adjust positions of the top electrodes; at the same time, output voltages and output currents of the rectifying units are controlled by the regulator.

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention.

Figure 2:
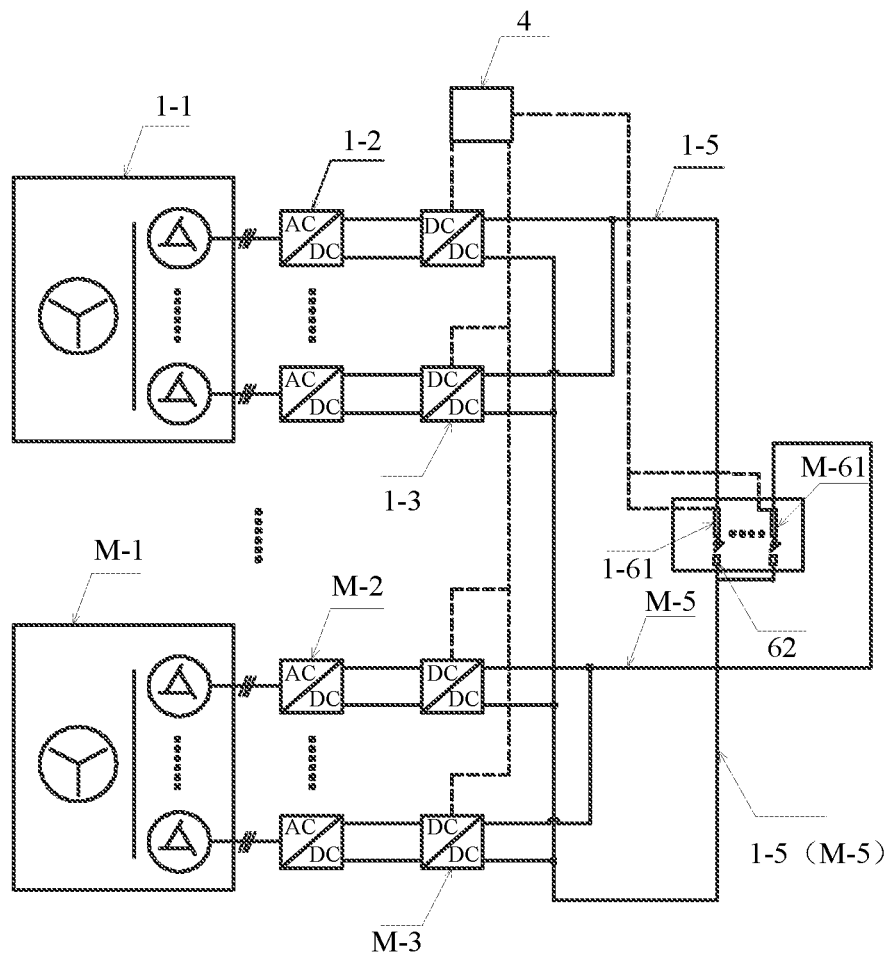
FIG. 2 is a structural schematic diagram of a power supply device for a DC electric arc furnace in an embodiment of the present invention.

See FIG. 2 to FIG. 3. It should be indicated that, the figures provided in the present embodiment only exemplarily explain the basic conception of the present invention, so only show the components associated with the present invention, and are not drawn in accordance with component number, shapes and sizes in actual implementation. Forms, number and proportions of the components in the actual implementation can be freely changed, and component layout forms may also be more complex. Structures, proportions and sizes drawn in the figures of the description are only used to match with the disclosure in the description for those skilled in the art to understand and read, not intended to limit implementation of the present invention, so have no technical material meaning. Any structural modification, proportional change and adjustment of sizes shall still be included in the scope of the technical contents revealed in the present invention without affecting the effects generated by the present invention and the purposes achieved by the present invention.

Specifically, as shown in FIG. 2, the present invention provides a power supply device for a DC electric arc furnace, comprising: phase-shifting rectifier transformers 1-1, rectifying units and a regulator 4;

Wherein an input end of each phase-shifting rectifier transformer 1-1 is connected to a power grid, a plurality of branches are led out from an output end of the phase-shifting rectifier transformer 1-1, each branch is respectively connected to one of the rectifying units, and outputs of a plurality of rectifying units are connected in parallel and then connected to a power supply short network of a DC electric arc furnace through bus bars 1-5, so that a current output topological structure is formed; an alternating current provided by the power grid is supplied to an electrode assembly (top electrodes 1-61 and a bottom electrode 62) of the DC electric arc furnace after voltage reduction, phase shifting, rectification, chopping and confluence, wherein the top electrodes 1-61 are removable electrodes, which are arranged on a lifting mechanism;

The lifting mechanism of the top electrodes 1-61 is controlled by the regulator 4 to adjust positions of the top electrodes 1-61; at the same time, output voltages and output currents of the rectifying units are controlled by the regulator 4.

More specifically, each rectifying unit comprises a rectifier 1-2 and a DC chopper 1-3; an input end of the rectifier 1-2 is connected to the output end of the phase-shifting rectifier transformer 1-1, an output end of the rectifier 1-2 is connected to an input end of the DC chopper 1-3, an output end of the DC chopper 1-3 is connected to a bus bar 1-5, and the bus bar 1-5 is connected to the power supply short network of the DC electric arc furnace; an input alternating current is rectified into a direct current by the rectifier 1-2, and an output voltage value and an output current value of the DC chopper 1-3 are adjusted by the regulator 4.

More specifically, as shown in FIG. 2, the power supply device for a DC electric arc furnace comprises M phase-shifting rectifier transformer(s) (1-1, . . . , M-1), M is an integer greater than or equal to 1, the current output topological structure corresponding to each phase-shifting rectifier transformer is respectively connected to a group of bus bars, the group of bus bars are respectively connected to an electrode assembly, and the electrode assembly comprises one or more top electrodes and the corresponding bottom electrode. The current output topological structure corresponding to each phase-shifting rectifier transformer can provide a stable large current for one electrode assembly, and the current output topological structures corresponding to M phase-shifting rectifier transformers can supply power to M electrode assemblies, so that requirement of a larger power supply current of the DC electric arc furnace can be satisfied.

Correspondingly, the number of the electrode assemblies of the DC electric arc furnace is not limited to one, the DC electric arc furnace can comprises a plurality of electrode assemblies, the top electrodes in the plurality of electrode assemblies are independent of each other, and the plurality of electrode assemblies can share one bottom electrode. As shown in FIG. 2, M electrode assemblies share one bottom electrode 62. It can be understood that, the bottom electrodes in the plurality of electrode assemblies can also be independent of each other.

Wherein the current output topological structure corresponding to each phase-shifting rectifier transformer is the same, as shown in FIG. 2, an input end of each phase-shifting rectifier transformer M-1 is connected to a power grid, a plurality of branches are led out from an output end of the phase-shifting rectifier transformer M-1, each branch is respectively connected to one rectifying unit which is composed of a rectifier M-2 and a DC chopper M-3, and outputs of a plurality of rectifying units are connected in parallel and then connected to a power supply short network of a DC electric arc furnace through bus bars M-5, so that a current output topological structure is formed; an alternating current provided by the power grid is supplied to an electrode assembly (top electrodes M-61 and a bottom electrode 62) of the DC electric arc furnace after voltage reduction, phase shifting, rectification, chopping and confluence; similarly, the lifting mechanism of the top electrodes M-61 is controlled by the regulator 4 to adjust positions of the top electrodes M-61, and the DC chopper M-3 is controlled by the regulator 4 to adjust an output voltage value and an output current value of the DC chopper M-3;

Based on the above power supply device for a DC electric arc furnace, the present invention also provides a power supply method for a DC electric arc furnace, comprising the following steps:

S1. Providing the power supply device for a DC electric arc furnace;

S2. Collecting working parameters of the DC electric arc furnace, which includes at least technological parameters, electrical parameters, and position parameters of lifting upright posts corresponding to each group of bus bars; and S3. Adjusting the positions of the top electrodes according to the working parameters, and adjusting an output voltage value and an output current value of each rectifying unit.

Specifically, in step S2, the technological parameters includes at least technological smelting stage information, an influence coefficient of smelting stage on stability of arc stability, and a current preset value of the top electrodes (1-61, . . . , M-61), and the electrical parameters includes an output voltage average value of DC choppers (1-3, . . . , M-3), an output current average value of the DC choppers (1-3, . . . , M-3), and conduction time of the DC choppers (1-3, . . . , M-3).

Optionally, between steps S2 and S3, the power supply method for a DC electric arc furnace of the present invention also comprises the following steps: a prediction model is established by a process model computer and an electric arc is predicted according to the technological parameters, the electrical parameters, and the position parameters of the lifting upright posts in the lifting mechanism corresponding to each group of bus bars collected in real time.

Specifically, during a production process of the DC electric arc furnace, the technological parameters and the electrical parameters thereof are collected in real time, and the position parameters of lifting upright posts are tracked in real time; next change of the electric arc is predicted according to the above parameters, corresponding parameterized modeling is conducted, and corresponding lifting upright post control strategies of the top electrodes are given, which can solve the problem that the regulator 4 is overshot due to the dynamic electrical characteristics of the electric arc itself or the electric arc moves slowly from one balance point to another due to the change of conditions in the furnace. Therefore, it is ensured that the regulator 4 can efficiently and steadily perform the effects of stabilizing arc burning and making the electric arc rapidly reach a new balance point due to external interference; when the temperature around the electric arc and the pressure in the furnace derived from the predicted process heat balance in smelting stage are significantly different from the actual values, the corresponding parameters in the function of the parameter $\beta$ of the technological smelting stage information estimated by a current-temperature model can be modified by manual input.

Specifically, in step S3, the step of adjusting the positions of the top electrodes according to the working parameters comprises:

S31. Obtaining the present instantaneous arc stability rate of the top electrodes and an output intermediate value of a target executor according to the working parameters;

S32. Respectively calculating difference between a current value corresponding to the output intermediate value and a current preset value, difference between a detected current value and the current preset value, and comparing the two differences;

S33. Outputting a final value of the target executor according to comparison result.

More specifically, in step S21, a calculation formula of the instantaneous arc stability rate is as follows:

$$G_{fn} = \left| \frac{K_{1n} \frac{\partial i_n}{\partial t} + K_{2n} \frac{\partial u_n}{\partial t}}{K_{3n} \frac{\partial d_n}{\partial t}} \right|$$

Wherein $G_{fn}$ is the instantaneous arc stability rate of the $n^{th}$ top electrode, $K_{1n}$ is a current change correction coefficient of the $n^{th}$ top electrode, $K_{2n}$ is a voltage change correction coefficient of the $n^{th}$ top electrode, $K_{3n}$ is an electrode mast speed change correction coefficient of the $n^{th}$ top electrode, $i_n$ is a current function of the $n^{th}$ top electrode, $u_n$ is a voltage function of the $n^{th}$ top electrode, $d_n$ is an electrode position function of the $n^{th}$ top electrode, and n is a positive integer less than or equal to M.

Optionally, in step S31, the present electrode mast speed of the top electrodes is periodically detected, and the electrode mast speed change correction coefficient $K_{3n}$ is dynamically corrected according to detection results. Specifically, speed detection is conducted regularly on an electrode hydraulic lifting mechanism of the DC electric arc furnace, and detection results are fed back to an instantaneous arc stability rate model, so as to correct the electrode mast speed change correction coefficient $K_{3n}$, and further correct the functional relationship between the speed of the electrode hydraulic lifting mechanism and the instantaneous arc stability rate. Wherein speed detection means to find the maximum speed and the minimum speed through the positive and negative maximum thresholds of an output proportional valve and the dead band minimum start threshold, and then correct a proportion curve through the ratio of an actual speed to an preset speed, so as to correct the proportional valve to meet preset values for maximum and minimum speeds in automatic conditions.

More specifically, in step S31, a calculation formula of the output intermediate value of the target executor is as follows:

$$s_n = K_p \left[ (\beta_{nN} * G_{fnN} - \beta_{n(N-1)} * G_{fn(N-1)}) - \frac{I_{cn}}{K} \right] + K_I * \left( \beta_{nN} * G_{fnN} - \frac{I_{cn}}{K} \right) + K_D \left( \beta_{nN} * G_{fnN} - 2\beta_{n(N-1)} * G_{fn(N-1)} + \beta_{n(N-2)} * G_{fn(N-2)} - 2\frac{I_{cn}}{K} \right)$$

Wherein $s_n$ is the output intermediate value of the target executor corresponding to the $n^{th}$ top electrode, $K_p$ is a proportionality coefficient, $K_I$ is an integral time conversion constant, $K_D$ is a differential time conversion constant, K is a hydraulic proportional amplification coefficient, $\beta_{nN}$ is a parameter of the technological smelting stage information of the $N^{th}$ stage corresponding to the $n^{th}$ top electrode, $G_{fnN}$ is the instantaneous arc stability rate of the $N^{th}$ stage corresponding to the $n^{th}$ top electrode, $I_{cn}$ is the current preset value of the $n^{th}$ top electrode, $\beta_{n(N-1)}$ is a parameter of the technological smelting stage information of the $(N-1)^{th}$ stage corresponding to the $n^{th}$ top electrode, $G_{fn(N-1)}$ is the instantaneous arc stability rate of the $(N-1)^{th}$ stage corresponding to the $n^{th}$ top electrode, $\beta_{n(N-2)}$ is a parameter of the technological smelting stage information of the $(N-2)^{th}$ stage corresponding to the $n^{th}$ top electrode, $G_{fn(N-2)}$ is the instantaneous arc stability rate of the $(N-2)^{th}$ stage corresponding to the $n^{th}$ top electrode, and N is an integer greater than or equal to 3.

More specifically, the step S33 of outputting a final value of the target executor according to comparison result comprises:

S331. When the comparison result is within a preset threshold range, the final value of the target actuator is 0;

S332. When the comparison result is outside the preset threshold range:

If $K*s_n - I_{cn} > 0$ and $I_n - I_{cn} > 0$, then

When $K*s_n > I_n$,

An output value is $$Sn = \partial \left( \frac{I_n}{K} - s_n \right),$$

When $K*s_n < I_n$,

An output value is $$Sn = \partial\left(s_n - \frac{I_n}{K}\right);$$

If $K*s_n - I_{cn} < 0$ and $I_n - I_{cn} > 0$, or $K*s_n - I_{cn} > 0$ and $I_n - I_{Ccn} < 0$, then An output value is $$Sn = \partial\left(s_n - \frac{I_{cn}}{K}\right);$$

If $K*s_n - I_{cn} < 0$ and $I_n - I_{cn} < 0$,

When $K*s_n < I_n$,

An output value is $$Sn = \partial\left(s_n - \frac{I_n}{K}\right);$$

Wherein $K*s_n$ is the current value corresponding to the output intermediate value $s_n$, $I_n$ is the detected current value of the $n^{th}$ top electrode, Sn is the final value of the target actuator corresponding to the $n^{th}$ top electrode, and $\partial$ is an adjustment sensitivity.

In an alternative embodiment of the present invention, the preset threshold range is −0.02 to 0.02; the value range of the adjustment sensitivity $\partial$ is 0.6 to 1, which is related to the response time of a hydraulic system; and communication with the process model computer is made once every a fixed time period (the time period can be determined according to specific equipment and field conditions, and the reference time period is 0.05 second).

Specifically, in step S3, the output voltage value and the output current value of each rectifying unit are adjusted according to the following calculation formula:

$$V_{arc} = V_{dc} \times (T_{on}/T),\ I_{arc} = I_{dc} \times (T/T_{on})$$

Wherein $V_{arc}$ is the output voltage average value of the DC choppers, $V_{dc}$ is an output voltage of the rectifier, $T_{on}$ is the conduction time of the DC choppers, T is a work cycle of the DC choppers, $I_{arc}$ is the output current average value of the DC choppers, and $I_{dc}$ is an output current of the rectifier.

In addition, the present invention also provides a computer readable storage medium and an electronic terminal; computer programs are stored in the computer readable storage medium, which realize the method as described in any one of the above paragraphs when executed by a processor; the electronic terminal comprises the processor and a memory, wherein the memory is used for storing the computer programs, and the processor is used for executing the computer programs stored by the memory, so as to make the electronic terminal execute the method as described in any one of the above paragraphs.

Specifically, for the computer readable storage medium, those skilled in the art should understand that all or some steps of implementing the above-mentioned method embodiments can be completed through hardware related to the computer programs. The computer programs can be stored in the computer readable storage medium, and when the computer programs are executed, the steps including those in the above-mentioned method embodiments are executed; and the computer readable storage medium includes various mediums, such as a ROM, a RAM, a magnetic disc or a compact disc, which can store program codes.

Specifically, the electronic terminal comprises the processor, the memory, a transceiver and a communication interface, wherein the memory and the communication interface are connected to the processor and the transceiver and complete the communication therebetween, the memory is used for storing the computer programs, the communication interface is used for communication, and the processor and the transceiver are used for running the computer programs, so as to make the electronic terminal execute the steps of the above power supply method for a DC electric arc furnace.

More specifically, the memory may include a random access memory (RAM), a read only memory (ROM) and also a non-volatile memory, such as at least one disk memory; and the processor can be a general-purpose processor such as a central processing unit (CPU) and a network processor (NP), and can also be a digital signal processor (DSP), an application specific integrated circuit (ASIC), a field programmable gate array (FPGA) or other programmable logic devices, discrete gate or transistor logic devices, and discrete hardware components.

To sum up, in the power supply device for a DC electric arc furnace provided by the present invention, through a structural design of a plurality of branches and a plurality of rectifying units at an output end of each phase-shifting rectifier transformer, and a structural design that outputs of the plurality of rectifying units are connected in parallel and then connected to a power supply short network of a DC electric arc furnace through bus bars, a current output topological structure is formed, which can provide a stable large current for one electrode assembly, and a plurality of current output topological structures can supply power to a plurality of electrode assemblies, so that requirement of a larger power supply current of the DC electric arc furnace can be satisfied; positions of top electrodes are judged and adjusted by the regulator according to real-time working parameters, which ensures that a lifting mechanism of the top electrodes can steadily perform the function of stabilizing arc burning for a long time; at the same time, output voltages and output currents of the rectifying units are adjusted by the regulator according to feedback of the real-time working parameters, so as to provide stable electric energy for the DC electric arc furnace.

The above embodiments are only used for exemplarily describing the principles and effects of the present invention rather than limiting the present invention. Any of those skilled in the art can modify or change the above embodiments without deviating from spirits and categories of the present invention. Therefore, all equivalent modifications or changes completed by ordinary intellectuals in the technical field without departing from spirits and technical thoughts revealed in the present invention shall still be covered by claims of the present invention.

The invention claimed is:

1. A power supply device for a DC electric arc furnace, comprising:

phase-shifting rectifier transformers, rectifying units and a regulator;

an input end of each phase-shifting rectifier transformer is connected to a power grid, a plurality of branches are led out from an output end of the phase-shifting rectifier transformer, each branch is respectively connected to one of the rectifying units, and outputs of the rectifying units are connected in parallel and then connected to a power supply short network of the DC electric arc furnace through bus bars, so that a current output topological structure is formed; an alternating current provided by the power grid is supplied to an electrode assembly of a plurality of electrode assemblies of the DC electric arc furnace after voltage reduction, phase shifting, rectification, chopping and confluence, wherein the electrode assembly comprises top electrodes and a bottom electrode, and the top electrodes are arranged on a lifting mechanism;

the lifting mechanism is controlled by the regulator to adjust positions of the top electrodes; at the same time, output voltages and output currents of the rectifying units are controlled by the regulator;

wherein each rectifying unit of the rectifying units comprises a rectifier and a DC chopper; an input end of the rectifier is connected to the output end of the phase-shifting rectifier transformer, an output end of the rectifier is connected to an input end of the DC chopper, an output end of the DC chopper is connected to a bus bar, and the bus bar is connected to the power supply short network; an input alternating current is rectified into a direct current by the rectifier, and an output voltage value and an output current value of the DC chopper are adjusted by the regulator.

2. The power supply device for a DC electric arc furnace of claim 1, wherein the power supply device for a DC electric arc furnace comprises the phase-shifting rectifier transformers, the current output topological structure corresponding to each of the phase-shifting rectifier transformers is respectively connected to a group of bus bars, the group of bus bars are respectively connected to the electrode assembly, and the electrode assembly comprises the bottom electrode and at least one of the top electrodes.

3. The power supply device for a DC electric arc furnace of claim 2, wherein the DC electric arc furnace comprises the plurality of electrode assemblies.

4. A power supply method for a DC electric arc furnace, comprising the following steps:

providing the power supply device for a DC electric arc furnace of claim 1;

collecting working parameters of the DC electric arc furnace, which includes at least technological parameters, electrical parameters, and position parameters of lifting upright posts corresponding to each group of bus bars; and adjusting the positions of the top electrodes according to the working parameters, and adjusting an output voltage value and an output current value of each of the rectifying units;

wherein the technological parameters includes at least technological smelting stage information, an influence coefficient of smelting stage on stability of arc stability, and a current preset value of the top electrodes, and the electrical parameters includes an output voltage average value of DC choppers, an output current average value of the DC choppers, and conduction time of the DC choppers.

5. The power supply method for a DC electric arc furnace of claim 4, wherein the step of adjusting the positions of the top electrodes according to the working parameters comprises:

obtaining an instantaneous arc stability rate and an output intermediate value of a target executor according to the working parameters;

respectively calculating difference between a current value corresponding to the output intermediate value and a current preset value, difference between a detected current value and the current preset value, and comparing the detected current value and the current preset value;

outputting a final value of the target executor according to the comparison between the detected current value and the current preset value.

6. The power supply method for a DC electric arc furnace of claim 5, wherein a calculation formula of the instantaneous arc stability rate is as follows:

$$G_{fn} = \left| \frac{K_{1n}\frac{\partial i_n}{\partial t} + K_{2n}\frac{\partial u_n}{\partial t}}{K_{3n}\frac{\partial d_n}{\partial t}} \right|$$

wherein $G_{fn}$ is the instantaneous arc stability rate of the $n^{th}$ top electrode, $K_{1n}$ is a current change correction coefficient of the $n^{th}$ top electrode, $K_{2n}$ is a voltage change correction coefficient of the $n^{th}$ top electrode, $K_{3n}$ is an electrode mast speed change correction coefficient of the $n^{th}$ top electrode, in is a current function of the $n^{th}$ top electrode, $u_n$ is a voltage function of the $n^{th}$ top electrode, $d_n$ is an electrode position function of the $n^{th}$ top electrode, and n is a positive integer.

7. The power supply method for a DC electric arc furnace of claim 6, wherein electrode mast speed of each top electrode is periodically detected, and the electrode mast speed change correction coefficient is dynamically corrected according to detection results.

8. The power supply method for a DC electric arc furnace of claim 7, wherein a calculation formula of the output intermediate value of the target executor is as follows:

$$s_n = K_p\left[(\beta_{nN} * G_{fnN} - \beta_{n(N-1)} * G_{fn(N-1)}) - \frac{I_{cn}}{K}\right] +$$

$$K_I * \left(\beta_{nN} * G_{fnN} - \frac{I_{cn}}{K}\right) +$$

$$K_D\left(\beta_{nN} * G_{fnN} - 2\beta_{n(N-1)} * G_{fn(N-1)} + \beta_{n(N-2)} * G_{fn(N-2)} - 2\frac{I_{cn}}{K}\right)$$

wherein $s_n$ is the output intermediate value of the target executor corresponding to the $n^{th}$ top electrode, $K_p$ is a proportionality coefficient, $K_I$ is an integral time conversion constant, $K_D$ is a differential time conversion constant, K is a hydraulic proportional amplification coefficient, $\beta_{nN}$ is a parameter of the technological smelting stage information of the $N^{th}$ stage corresponding to the $n^{th}$ top electrode, $G_{fnN}$ is the instantaneous arc stability rate of the $N^{th}$ stage corresponding to the $n^{th}$ top electrode, $I_{cn}$ is the current preset value of the $n^{th}$ top electrode, $\beta_{n(N-1)}$ is a parameter of the technological smelting stage information of the $(N-1)^{th}$ stage corresponding to the $n^{th}$ top electrode, $G_{fn(N-1)}$ is the instantaneous arc stability rate of the $(N-1)^{th}$ stage corresponding to the $n^{th}$ top electrode, $\beta_{n(N-2)}$ is a parameter of the technological smelting stage information of the $(N-2)^{th}$ stage corresponding to the $n^{th}$ top electrode, $G_{fn(N-2)}$ is the instantaneous arc stability rate of the $(N-2)^{th}$ stage corresponding to the $n^{th}$ top electrode, and N is an integer greater than or equal to 3.

9. The power supply method for a DC electric arc furnace of claim 8, wherein the step of outputting a final value of the target executor according to the comparison result comprises:

when the comparison result is within a preset threshold range, the final value of the target actuator is 0;

when the comparison result is outside the preset threshold range:

if $K*s_n-I_{cn}>0$ and $I_n-I_{cn}>0$, then when $K*s_n>In$, an output value is $$Sn = \partial\left(\frac{I_n}{K} - s_n\right),$$

when $K*s_n<In$, an output value is $$Sn = \partial\left(s_n - \frac{I_n}{K}\right);$$

if $K*s_n-I_{cn}<0$ and $I_n-I_{cn}>0$, or $K*s_n-I_{cn}>0$ and $I_n-I_{Ccn}<0$, then an output value is $$Sn = \partial\left(s_n - \frac{I_{cn}}{K}\right);$$

if $K*s_n-I_{cn}<0$ and $I_n-I_{cn}<0$, when $K*s_n<I_n$, an output value is $$Sn = \partial\left(s_n - \frac{I_n}{K}\right);$$

wherein $K*s_n$ is the current value corresponding to the output intermediate value $s_n$, $I_n$ is the detected current value of the $n^{th}$ top electrode, Sn is the final value of the target actuator corresponding to the $n^{th}$ top electrode, and $\partial$ is an adjustment sensitivity.

10. The power supply method for a DC electric arc furnace of claim 4, wherein the output voltage value and the output current value of each rectifying unit are adjusted according to the following calculation formula:

$$V_{arc}=V_{dc}\times(T_{on}/T), I_{arc}=I_{dc}\times(T/T_{on})$$

wherein $V_{arc}$ is the output voltage average value of the DC choppers, $V_{dc}$ is an output voltage of the rectifier, $T_{on}$ is the conduction time of the DC choppers, T is a work cycle of the DC choppers, $I_{arc}$ is the output current average value of the DC choppers, and $I_{dc}$ is an output current of the rectifier.

\* \* \* \* \*